Sept. 3, 1957      E. B. LEWIS      2,805,340
PIEZOELECTRIC APPARATUS

Filed Nov. 12, 1953      4 Sheets-Sheet 1

INVENTOR.
ERNEST B. LEWIS.
BY
Louis V. Lucia
ATTORNEY.

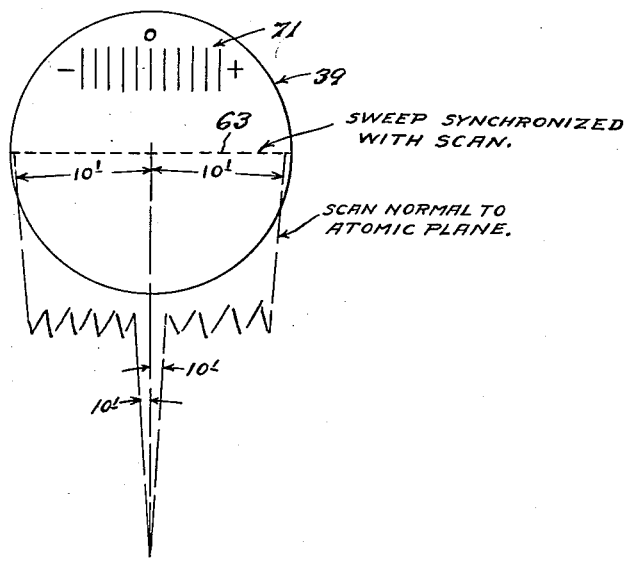
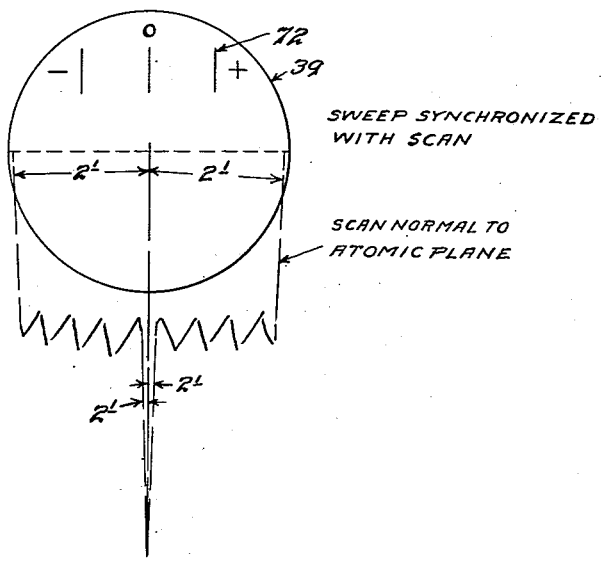

United States Patent Office 2,805,340
Patented Sept. 3, 1957

2,805,340

PIEZOELECTRIC APPARATUS

Ernest B. Lewis, Glastonbury, Conn.

Application November 12, 1953, Serial No. 391,445

4 Claims. (Cl. 250—53)

This invention relates to a piezoelectric apparatus and more particularly to an apparatus for measuring angular differences in and testing piezoelectric quartz or plates of the type cut from quartz, or the like, having crystallographic axes and a plurality of different planes which include atomic planes and planes having different characteristics.

It is well known by those skilled in the art that such piezoelectric plates are generally cut so that a plane, commonly called an electric plane, which is selected for certain desired characteristics as to temperature effects and frequency ranges, is orineted with the face of the plate by means of which the plate is positioned in the electronic instrument or other device in which it is to be used.

Such electric planes are generally disposed within the plane at known angles to one or more atomic planes and, since such atomic planes are capable of reflecting X-rays with maximum intensity when disposed at a predetermined angle to the incident X-ray beam, one of the convenient atomic planes having the best reflective properties is selected as a working plane for determining the orientation of the electric plane with relation to the plate face.

After such plates have been oriented with the selected electric planes and cut, it is desirable to check their orientation in order to determine whether or not the angle between the electric plane and the plane of the plate face is accurate within allowed plus and minus tolerances. Heretofore, such checking has commonly been done in conventional checking apparatus by projecting an X-ray beam upon the selected atomic plane at a predetermined angle, commonly known as the "Bragg" angle, and reflecting the said beam from the atomic plane into an ionization chamber in which the reflected X-ray causes a gas to be ionized and thereby become a conductor of electrical energy to an extent which corresponds to the intensity of the said reflected X-ray. This energy is then used for operating a suitable indicating instrument, such as a milliammeter, having a pointer which moves over a dial and thereby indicates the instant when the reflection of the X-ray beam reaches maximum intensity in the ionization chamber.

The apparatus for checking the oriented plates is usually provided with a suitable holder having a surface which is engaged by the plate face and thereby positions the plate at the proper angle with relation to the incident X-ray beam. The X-ray tube, ionization chamber and holder are preadjusted with relation to each other so that, when an accurately oriented plate is placed upon the holder, the incident X-ray beam will be reflected by the atomic plane of the plate directly into the ionization chamber wherein ionization of the gas will take place to a degree corresponding with the intensity of the reflected beam.

In the use of such conventional checking apparatus for determining the accuracy of orientation of the atomic plane with the plate face, the plate to be checked was first placed upon the holder and the said holder was then oscillated with a manually operated lever so that it would rock the plate about the axis of the holder and thereby increase and decrease the intensity of the reflection of the X-ray beam into the ionization chamber. The orientation of the atomic plane to the face plate would then be ascertained by noting the position of the operating lever with relation to a graduated scale at the instant when the needle of the indicating instrument passed the point of maximum intensity of reflection on the indicator dial. Due to the fact that the said needle would fluctuate with the slightest rocking movement of the plate and provide only a momentary indication, it has been extremely difficult to read the exact position of the operating lever at the instant when the needle indicated the maximum intensity of reflection and, therefore, it has required a great deal of experience and alertness on the part of the operator to determine whether or not the angle of the atomic plane with relation to the plate face was within specified limits.

It is not uncommon practice to require an accuracy of plus or minus one minute in a specified angle between the electric plane and the plane of the plate face and for that reason the checking of piezoelectric plates for determining such accuracy has been extremely difficult with heretofore known instruments and methods of checking.

It is, therefore, an object of this invention to provide a novel apparatus for facilitating the checking operation for determining the degree of accuracy in the orientation of planes in piezoelectric plates.

A further object of this invention is to provide such apparatus which will accurately indicate the disposition of a plane in a piezoelectric plate with relation to the plane of an exterior surface.

A still further object is to provide such apparatus which will render a steady visual indication of the actual disposition of an exterior plane of a piezoelectric plate with relation to an X-ray reflective plane therein.

A still further object of the present invention is to provide such apparatus which can be readily operated, even by inexperienced persons, to expedite testing of such plates and to accurately display upon a graph, or other visual means, the actual disposition of an X-ray reflective plane in the plate with relation to the exterior or mechanical surface thereof by which it is supported in said apparatus.

A still further object of the invention is the provision of a novel electric circuit for controlling the operation of said apparatus.

Further objects and advantages of the present invention will be more clearly understood from the following description and from the accompanying drawings in which:

Fig. 4 is a front view illustrating the use of a wide tolerance scale in connection with my improved apparatus.

Fig. 5 is a similar view illustrating a close tolerance scale.

Figure 1:
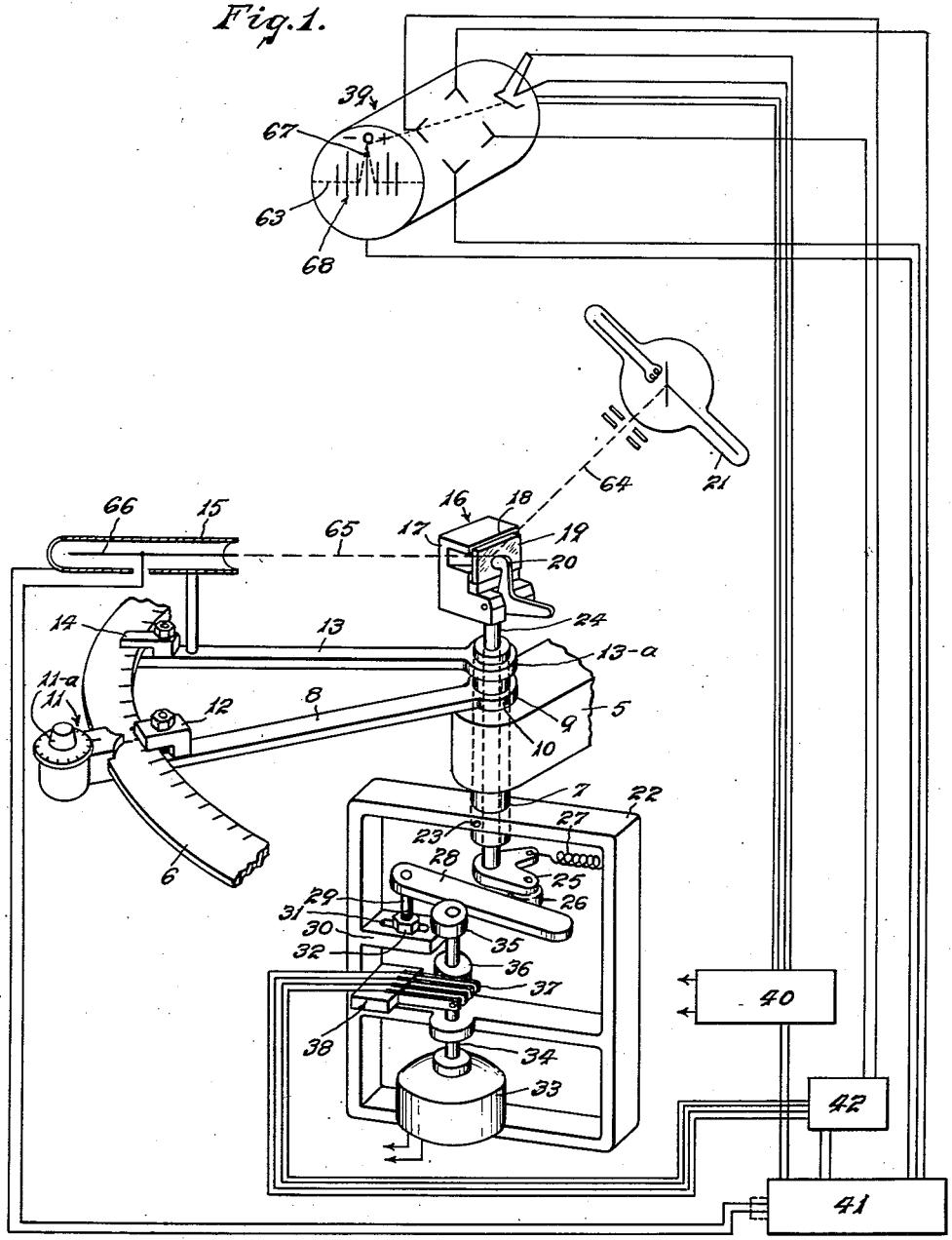
Fig. 1 is a schematic view illustrating the features of my improved apparatus which embody the present invention.

In the embodiment of my invention which is illustrated in the drawings, the numeral 5 denotes a portion of a base of a checking apparatus and the numeral 6 denotes a portion of a sector which is in fixed position in said apparatus and graduated to denote degrees.

The base portion 5 has a pivotal member 7 rotatably mounted therein and an adjusting lever 8 having a hub portion 9 rigidly secured to said member, by such means as a pin or set screw 10, and extends therefrom to the sector 6. The end of the said lever 8 carries a suitable adjustment mechanism 11 which swings the lever about the axis of the member 7 and along the sector 6 upon the rotation of an adjustment knob 11–a that has a dial which is graduated along its periphery to provide a scale that may denote minutes and seconds and which cooperates with the scale on the said sector to indicate the angular position of the lever 8. The said lever is retained in adjusted position by means of a clamp 12 which secures the lever to the sector 6.

A supporting bar 13 is pivoted upon the member 7 by means of a hub portion 13–a which is rotatable on said member so that the bar will swing upon it to permit adjustment of the bar about the axis of the member. The end of said supporting bar may be retained in adjusted position by means of a clamp 14 which secures it to the sector 6.

An ionization chamber 15 is mounted upon the supporting bar 13 and is, therefore, adjustable with said bar about the axis of the member 7.

A holding device 16 is provided for holding the piezoelectric plates in position to be tested in said instrument. This holding device, as shown, is of a conventional form and includes a block 17 having a plate positioning surface 18 which is preferably located upon the pivotal axis of the lever 8 and engages the face of the piezoelectric plate which is indicated at 19. A clamp, preferably in the form of a lever 20, is pivoted upon the block 17 and is actuated by a spring, not shown, to releasably retain the plate with its face against the surface 18.

A suitable X-ray tube, indicated at 21, is provided in the instrument for projecting an X-ray beam upon the plate being checked and the said beam is reflected by the atomic plane of the said plate into the ionization chamber 15.

Checking apparatus such as that so far described are of a conventional form commonly known by those skilled in the art and are used in the following manner;

The ionization chamber 15 and the X-ray tube 21 are first adjusted so that the X-ray beam will be reflected into the ionization chamber by the atomic planes of the plates being checked.

Each piezoelectric plate to be checked is placed upon the holder 16 with its face against the surface 18 and the lever 20 is then allowed to engage said plate and retain it in checking position. The lever 9 is then manually operated to oscillate the holder 16 and the piezoelectric plate mounted thereon. This oscillation causes the reflection of the X-ray beam into the ionization chamber to increase and decrease in intensity and it will reach maximum intensity at the point when the atomic plane is disposed at the correct angle between the incident and reflected portions of the X-ray beam. In said conventional instruments, the operator of the apparatus is required to ascertain the exact position of the lever 9, by noting the position of the pointer 22 with relation to the graduations on the sector 6, at the instant when the pointer of the indicating instrument indicates maximum intensity of reflection and the reading on said graduations will then indicate whether or not the angle of the atomic plane in the plate being tested is accurate within the plus or minus limits allowed with relation to the plate face.

The above described manner of checking piezoelectric plates by conventional apparatus has required a great deal of skill and care upon the part of the operator and it is well recognized in the art that, at best, only partially satisfactory results can be obtained with such conventional apparatus and that checking piezoelectric plates therewith for very close plus or minus tolerances is practically impossible and the results very uncertain.

The present invention is particularly directed to the provision of visual means providing a steady indication of the point at which the reflection of the X-ray beam into the ionization chamber is at its maximum intensity and, in order to attain the objects of my invention, I have provided a novel mechanism and electric circuit with electronic means therein which will now be described.

In the embodiment of the mechanism illustrated in Fig. 1, the member 7 is in the form of a sleeve and there is provided a supporting frame 22 which is rigidly secured to the said member by such means as a pin 23. The holder 16 is then mounted upon a vertical rocker shaft 24 which is co-axial with and rotatable in the member 7. This shaft has secured at its lower end a rocker lever 25 which carries thereon a roller 26. A spring 27 is anchored to the frame 22 and urges said roller into contact with a rocker lever 28 which is pivoted upon a pivot post 29 that is supported upon the portion 30 of the frame 22. The said post is adjustable in the frame by extending through a slot 31 and a clamping nut 32 is provided for securing the said post in adjusted position.

A constant speed electric motor 33 is mounted upon the frame 26 and has a driving shaft 34 which extends therefrom and carries a cam 35 that is engaged by the lever 28. The said lever may be adjusted relatively to the cam 35 by changing the position of the post 29 in the slot 31 and thereby varying the swing of said lever by the cam and the amount of movement which is transmitted thereby to the rocker lever 25. The driving shaft 34 also carries a separate cam 36 which is adapted to flex a plurality of contact blades 37 of a multiple switch 38 that is stationarily mounted upon the frame 22.

In addition to the said novel mechanism, I provide an electric circuit such as shown in Fig. 1, mostly in block form, for attaining the objects of my invention. The said circuit includes a conventional oscilloscope 39 and various electronic units for controlling the operation thereof; such as a low voltage and bias supply, indicated at 40, a vertical deflection D. C. amplifier, indicated at 41, and a horizontal sweep circuit indicated at 42. It is to be understood, however, that various modifications of the said circuit and the different units contained therein may be used without departing from the scope of the present invention and a detailed description of the complete circuit and the electronic units therein is, therefore, believed unnecessary with the exception of the horizontal sweep unit which has been especially designed for use with the present invention and will now be described in further detail.

Figure 6:
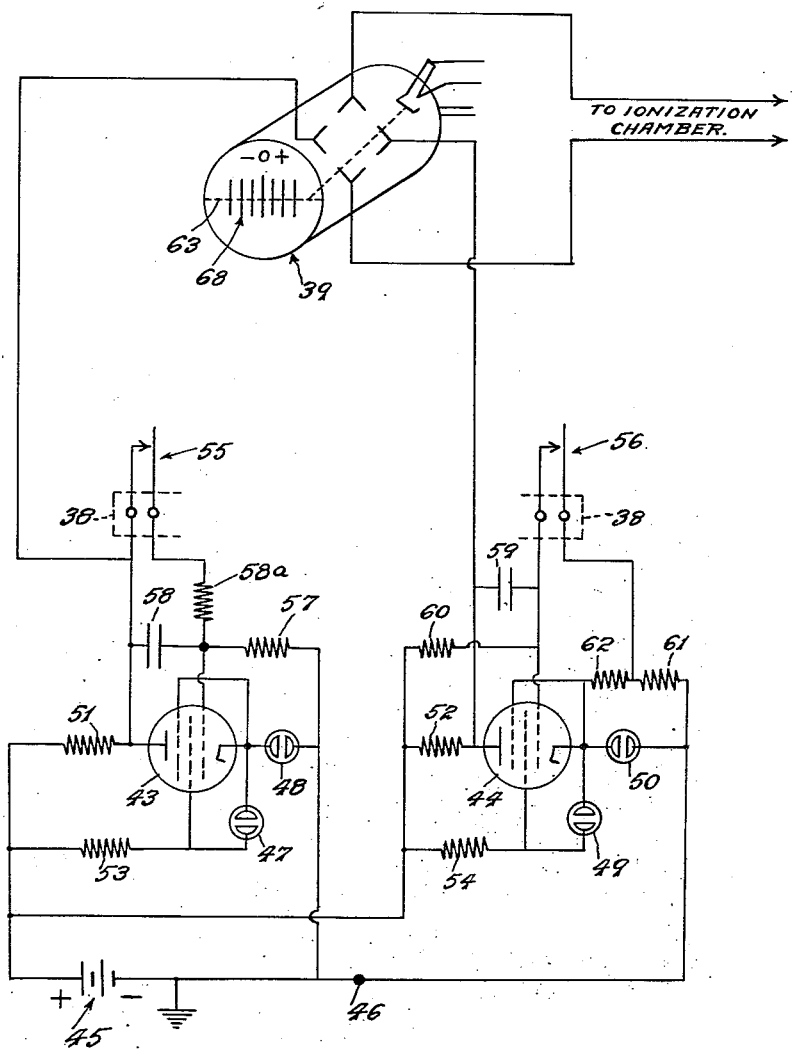
Fig. 6 is a diagrammatic view of an electric circuit and electronic units for controlling the operation of said apparatus.

As shown in Fig. 6 of the drawings, the electronic circuit of the said horizontal sweep unit preferably includes two vacuum tubes 43 and 44 of the type commonly called sharp cut-off pentodes. These tubes are supplied with filament heating voltage by a regulated direct voltage source which may include the units 40 and 41, shown in Fig. 1, and is represented by the battery 45 in Fig. 6. The cathode and screen grid potentials of the said vacuum tubes are fixed with reference to reference point 46 by glow discharge tubes 47, 48, 49 and 50. The second anode currents of vacuum tubes 43 and 44 are supplied through plate load resistors 51 and 52. Resistors 53 and 54 are provided to limit the current in the glow discharge tubes.

The said horizontal sweep circuit is provided with a pair of switches 55 and 56 which are included in the blades 37 of the multiple switch 38. When the said switches are in their normally open position, as shown, tube 44 has zero bias and conducts heavily, lowering its second anode potential nearly to its cathode potential with reference to point 46, and tube 43 is held to beyond plate-current cut-off by the resistor 57, causing its plate voltage to be nearly the same as the potential of supply 46 with respect to point 46. Capacitor 58 is thus charged to a relatively high voltage, and capacitor 59 is charged to a relatively low voltage. The right-hand horizontal deflection plate of the cathode-ray oscilloscope 39 is, therefore, positive with respect to the left-hand plate and the electron beam is deflected to the right on the oscilloscope screen.

When the switches 55 and 56 close, capacitor 58 is discharged through the current limiting resistor 58-a and capacitor 59 is charged through resistors 61 and 52, while the tube 44 is brought to plate-current cut-off by the resistors 62 and 61. This sequence of events causes the right hand deflection plate of the oscilloscope 39 to become positive with respect to the left-hand plate and the electron beam will then move very rapidly to the right-hand side of the screen.

After a short interval, the switches 55 and 56 are opened by the cam 35 to initiate the horizontal sweep. Capacitor 58 then begins to charge slowly through the relatively high value resistor 57 and the relatively low value resistor 51. The potential of the control grid of the tube 43 with respect to its cathode therefore begins to increase in the negative direction. This causes a reduced plate current in the tube 43 and less potential drop across the resistor 51 and results in a higher potential from the plate of the tube 43 to its cathode.

The potential change across the resistor 51 is many times the control grid-to-cathode potential change because of the voltage amplifying properties of the tube 43 with its proper load resistor 51. This rise in potential of the plate of the tube 43 with respect to its cathode must also result in a positive-going increment of grid-to-cathode voltage of the tube 43, since the increase in potential on the top plate of the capacitor 58, with respect to the cathode, causes a nearly identical potential increment to appear from control grid to cathode of the tube 43 due to the fact that the charge on the capacitor 58 remains nearly constant during the nearly instantaneous period of this analysis.

Thus, to the original negative increment of grid-to-cathode voltage caused by the charge of the R-C circuit 58—57—51 is added a vastly greater positive increment of grid-to-cathode voltage which is caused by the action of the tube 43 described above. As a result of this circuit behavior, during the period of the charging of the capacitor 58, the control grid-to-cathode potential varies from about zero to the negative plate-current cutoff value, while the plate-to-cathode potential of 43 varies from a minimum value to the voltage of the battery 45 minus the voltage drop across the bulb 48. During this period, therefore, the voltage across the resistor 57 changes by only a few volts out of about sixty, the total established by the regulator neon bulb 48. Since the current through the resistor 57 is maintained constant, the current through it and also through the capacitor 58, is maintained constant during the period of charge and, by a well-known property of a capacitor, the potential rise across it is then linear with time increase.

Simultaneously with these events, capacitor 59 is discharging through the relatively high resistor 60 and the relatively low resistor 52. The voltage across 60 is held essentially constant during the discharge by the tube 44 in a manner similar to that described above and the potential fall across capacitor 59 is again linear with time increase.

As capacitor 58 charges linearly and capacitor 59 discharges linearly with time, the potential of the left-hand plate of the oscilloscope 39 decreases with respect to reference point 46 and the potential of the right hand plate increases with respect to said point with the result that the electron beam of the oscilloscope 39 moves from right to left across the screen of the oscilloscope at a uniform rate of travel.

The beam position on the face of the oscilloscope is dependent upon the elapsed time from the instant of opening of the switches 55 and 56, and is not dependent upon minor component variations or power supply voltage fluctuations. Therefore, if the piezoelectric plate being checked is oscillated at a constant rate of speed, the horizontal travel of the oscilloscope beam will be exactly related to the angular position of the piezoelectric plate and the line of travel of said beam across the oscilloscope screen will be deflected vertically at the point where the X-ray beam is reflected into the ionization chamber and this deflection will take form in accordance with the increase and decrease in the intensity of the reflection and thereby appear in said line as a pointer which is steady with relation to a suitable series of graduations on the screen and its position along said graduations will indicate the degree of accuracy of the orientation between the atomic plane and the face of the piezoelectric plate.

In the use of the checking apparatus shown in Fig. 1, which is constructed in accordance with the present invention, and the electric circuit therefor shown in Fig. 6, the lever 8 is first adjusted along the sector 6 to angularly locate the holder 16 so that it will support a correctly oriented piezoelectric plate thereon in position to reflect the incident X-ray beam 63 off the atomic plane of said plate and into the ionization chamber 15 with maximum intensity and at the instant when the oscilloscope beam is at the zero point of the scale on the oscilloscope screen. Movement of the lever 8 along the sector 6 will rotate the sleeve 7 and therewith rotate the frame 22 which carries the oscillating mechanism. Rotation of said frame will rotate the holder 16 in accordance with the adjustment of the lever 8 along the sector 6. The ionization chamber 15 is then adjusted to properly receive the reflected X-ray beam 64 and the pivotal post 29 is adjusted in the slot 30 to position the lever 28 with relation to the cam 35 so that it will oscillate the holder 16 to a degree depending upon the closeness of the plus and minus tolerance which is required in the accuracy of the angle between the atomic plane and the plane of the plate face which is to be checked. It will be understood that when the apparatus is being adjusted for checking wide tolerances, the pivotal post 29 is moved closer to the cam 35 and the lever 28 will then swing to a greater degree and thereby oscillate the piezoelectric plate through a wider arc so that the atomic plane will be scanned by the incident X-ray beam through a wider range. When it is desired to check the plate for a closer tolerance, the pivot post 29 is moved towards the left of the slot 31, or farther away from the cam 35, and the swinging of the lever 28 by the cam 35 will then be reduced and the oscillation of the plate accordingly reduced to scan the atomic plane through a shorter range.

After the said improved apparatus has been accurately adjusted for testing piezoelectric plates to the accuracy required, it may be set in operation by closing a suitable electric switch, not shown, and thereby energizing the electric circuit, the electronic units and the X-ray tube 21. This will cause the line of travel of the oscilloscope beam to appear as a straight line, indicated at 65, extending across the screen of the oscilloscope and the apparatus is then ready for use. A piezoelectric plate, indicated at 19, is then placed upon the surface 18 of the holder 16 and the lever 20 is released to clamp the said plate in position as above described. As the plate 19 is oscillated by the cam 35, the said cam also operates the switches 55 and 56 and the movements of the plate and oscilloscope beam are thereby synchronized. The atomic plane of said plate will then reflect the X-ray beam into the ionization chamber with increasing intensity as it nears the Bragg angle with respect to the incident X-ray beam and the reflected beam will reach maximum intensity at the instant when the atomic plane reaches the Bragg angle. As the reflected portion 64 of the X-ray beam enters the ionization chamber 15, it will strike the collector plate 66 and thereby cause a varying potential in the circuit of the vertical deflection amplifying unit 41 which will cause the line 65 to be deflected and a jog 67 to appear therein in the form of an arrow. The position of the highest point of said jog 67 will then indicate the exact point at which the X-ray beam was reflected upon the plate 66 with maximum intensity and the instant during the sweep of the oscilloscope beam when the atomic plane was at the Bragg angle with respect to the incident X-ray beam and, by noting the position of the said point with relation to graduations 68 on the oscilloscope screen, the accuracy of the atomic plane angle with relation to the face of the piezoelectric plate being tested is readily determined.

Figure 2:
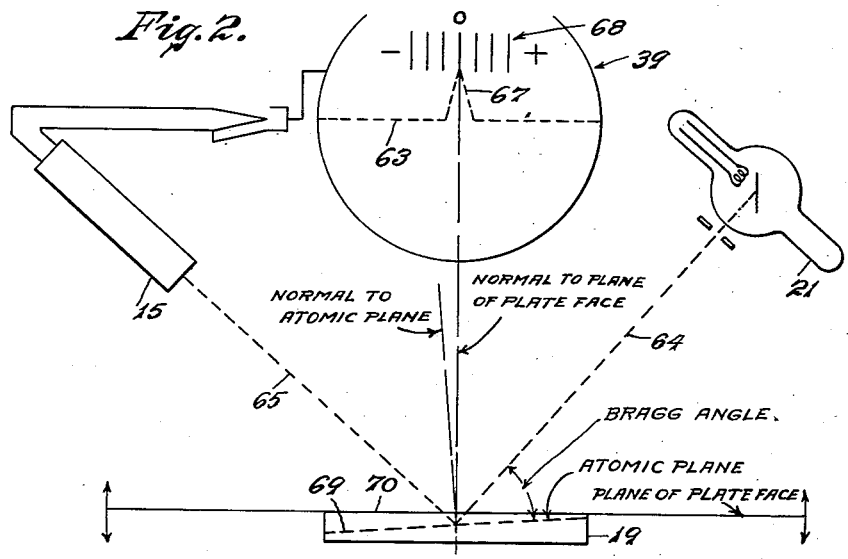
Fig. 2 is a diagrammatic view illustrating the indication of a plane that is accurately oriented in a piezoelectric plate.
Figure 3:
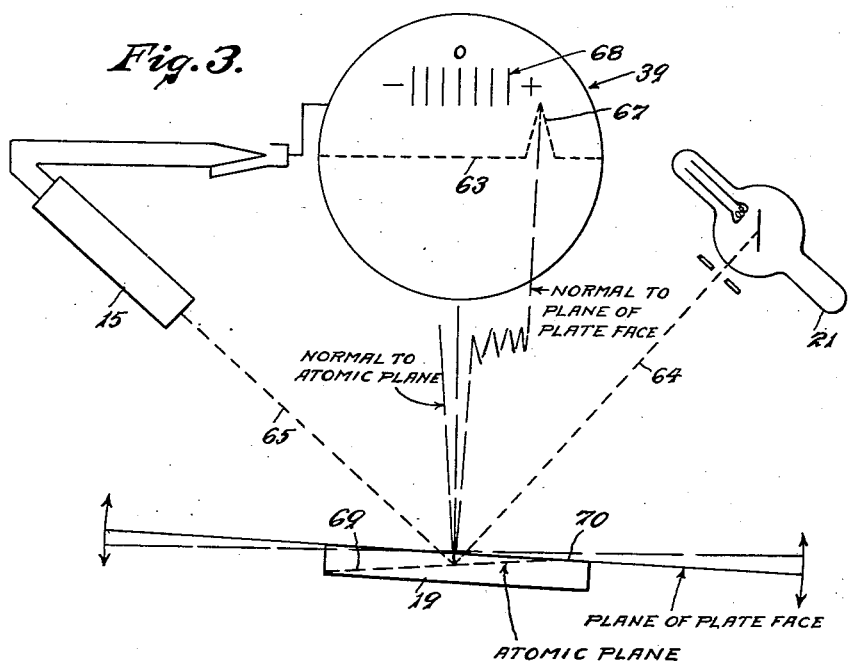
Fig. 3 is a similar view illustrating the indication of an error in the orientation of a plane of a similar plate.

The results produced by my improved checking apparatus may be better understood from the diagrammatic illustrations in Figs. 2 and 3 of the drawings.

When the angle of the atomic plane with relation to the face plate is accurate, the visual indication upon the oscilloscope screen 39 will appear as shown in Fig. 2 and the point of the jog 67 will be in line with the zero point of the graduations 68.

When the said angle is inaccurate on the plus side, the indication will appear as shown in Fig. 3 and the point of the jog 67 will be on the plus side of the scale graduations 68. It will be noted in said Fig. 3 that, while the normal of the atomic plane 69 is in the same position as the normal of the atomic plane shown in Fig. 2, the normal of the face 70 of the piezoelectric plate is to the right of the zero mark on the said scales, which means that the angle between the atomic plane and the face of the plate is greater than the specified angle, and there is, therefore, indicated by the jog 67 the plus error in the position of the atomic plane with relation to the plate face.

Figs. 4 and 5 illustrate, also diagrammatically, the results which may be obtained by the adjustment of the oscilloscope lever 28. Fig. 4 shows the results when the said lever is adjusted for checking a large tolerance such as plus or minus five minutes. It will be noted that the scanning movement of the plate extends nearly along the entire sweep of the visible line 63. This is accomplished by adjusting the lever 28 so that the plate will swing, for instance, ten minutes to the right and left, a total of twenty minutes, during the time period that it takes the oscilloscope sweep beam to move across the screen. The scale 71 is then provided to indicate plus or minus five degrees and the reading of the plates being checked is made accordingly. In Fig. 5 there is illustrated the results obtained when the lever 28 is adjusted to magnify a fine reading of as close as plus or minus one minute. In such a setting, the plate is oscillated to the right and left for a distance of two minutes during the sweep of the oscilloscope beam across the screen and the graduations of the scale 72 are widened so as to magnify plus or minus one minute.

It will be understood that, by adjusting the lever 28, the length of the oscillating movement of the piezoelectric plate may be varied so that it will move at a faster rate of speed through a wider angle, or at a lesser rate of speed but through a narrower angle during the time that it takes the oscilloscope beam to travel across the screen; thus any error in the orientation of an atomic or related plane with the plane of the face of a piezoelectric plate may be magnified to a greater or lesser extent, depending on the plus or minus limits allowed, to thereby provide for greatly facilitating and speeding the accurate checking of the piezoelectric plates regardless of the closeness between allowed plus or minus limits.

It will be further understood that the frequency of the sweep of the electronic beam across the oscilloscope screen is governed by the speed of the constant speed motor 33 since each rotation of the motor will close and open the switches 55 and 56 and thereby cause a single sweep of said beam. Therefore, the speed of the motor determines the frequency of the sweep of the electronic beam and the said frequency is made sufficiently high to present what appears to be a steady line extending across the screen. The jog 67, which is caused by the deflection of the electronic beam during each sweep thereof, also appears to be steady in said line and the indication rendered by the position of said jog along the scale on the oscilloscope screen may be readily and accurately read.

I claim:

1. Apparatus for determining the orientation in a plane of a piezoelectric plate including a holder for said plate, means for projecting an X-ray beam upon a reflective plane in a piezoelectric plate mounted upon said holder, an ionization chamber adapted to receive a reflection of said X-ray beam from the reflective plane, an oscilloscope, means for projecting an electronic beam upon the screen oscilloscope, electronic means for causing said electronic beam to sweep across the oscilloscope screen, and mechanism for oscillating the holder and plate thereon to cause fluctuations in the intensity of the reflection in the ionization chamber in synchronism with the sweep of the electronic beam across the oscilloscope screen; the said mechanism including a lever for oscillating the holder, an electric switch for controlling the said electronic means, a constant speed motor, a shaft driven by said motor, means on said shaft for operating the said switch and lever in synchronism, and adjusting means for adjusting the said lever to lengthen the travel and increase the speed or shorten the travel and reduce the speed of the oscillating movement of the holder.

2. Apparatus for determining the orientation of a plane in a piezoelectric plate, the said apparatus including a rocker shaft, a holder carried by said rocker shaft, means for projecting an X-ray beam upon a reflective plane in a piezoelectric plate mounted upon said holder, an ionization chamber positioned to receive reflection of the X-ray beam from the reflective plane, an oscilloscope, means for projecting an electronic beam upon the screen of said oscilloscope, electronic means for causing said electronic beam to sweep across the said screen, an electric switch for controlling the operation of said electronic means, a rocker lever secured to the rocker shaft, a pivot member, an oscillating lever pivoted upon said member for operating the rocker lever to cause oscillation of the holder and the piezoelectric plate thereon and thereby vary the reflected X-ray beam into the ionization chamber, a drive shaft, a constant speed motor for rotating said shaft, cam means on said shaft for operating the oscillating lever and the said switch in synchronism, electronic means energized by the reflection of the X-ray beam in the ionization chamber to cause deflection in the sweep of the electronic beam across the oscilloscope screen, and means for adjusting the position of the pivot member to vary the movement of the oscillating lever by the cam means and thereby lengthen the travel and increase the rate of speed, or shorten the travel and reduce the rate of speed of the oscillating movement of the holder during each sweep of the electronic beam across the oscilloscope screen.

3. Apparatus for determining the orientation of a plane of a piezoelectric plate including a holder, means for projecting an X-ray beam upon a reflective plane of a piezoelectric plate mounted upon said holder, an ionization chamber positioned to receive a reflection of said X-ray beam from the reflective plane, an oscilloscope, means for projecting an electronic beam upon the screen of said oscilloscope, electronic means for causing said electronic beam to sweep across the oscilloscope screen, an electric switch for controlling the operation of said electronic means, separate electronic means controlled by the reflection in the ionization chamber for deflecting the sweep of the electronic beam across the oscilloscope screen, mechanism for oscillating the holder to vary the reflection in the ionization chamber, a motor for operating said mechanism and electric switch in synchronism to thereby synchronize the sweep of the electronic beam and the oscillating movement of the holder and start each cycle of said sweep and movement simultaneously to thereby cause deflection of the electronic beam at a point of its sweep corresponding to the angular position of the reflected plane in the piezoelectric plate, scale graduations upon the oscilloscope screen cooperating with the deflection to indicate the angular position of the reflective plane, adjusting means in said oscillating mechanism for lengthening the sweep of the reflected X-ray beam and increasing the speed thereof to thereby magnify the indication provided by the deflection in the sweep of the electronic beam, and a graduated scale upon the oscilloscope screen magnified in accordance with the magnification of the indication.

4. Apparatus for determining the orientation of a plane in a piezoelectric plate which includes a supporting member, a sleeve rotatably mounted in said supporting member, a frame secured to said sleeve and rotatable therewith, a rocker shaft extending through said sleeve and rotatable therein, a holder carried by said rocker shaft, a mechanism mounted in said frame for oscillating said holder, said mechanism including a rocker lever on said rocker shaft, an oscillating lever fulcrumed on said frame, an electric motor for operating said oscillating lever mounted on said frame, a sector, a lever secured to said sleeve and adjustable along said sector for varying the position of the frame and the mechanism thereon to thereby vary the angular position of the holder, means for projecting an X-ray beam upon a piezoelectric plate mounted on said holder, a supporting member rotatable about said sleeve and adjustable along said sector, an ionization chamber carried on said supporting member in position to receive a reflection of the X-ray beam from a reflective plane in the piezoelectric plate, an oscilloscope, means for projecting an electronic beam upon the oscilloscope screen, electronic means for causing said electronic beam to sweep across the oscilloscope screen, an electric switch for controlling said electronic means, means driven by the said motor for operating the switch in synchronism with the oscillating mechanism to thereby start an oscillating movement of the holder and a sweep of the electronic beam simultaneously, and means for causing a deflection in the sweep of the electronic beam in accordance with variations in the reflection of the X-ray beam in the ionization chamber to thereby indicate upon the oscilloscope screen the angular position of the reflective plane with relation to a surface of the piezoelectric plate by which it is positioned in the holder.

References Cited in the file of this patent

UNITED STATES PATENTS

| | | |
|---|---|---|
| 2,151,736 | Broughton | Mar. 28, 1939 |
| 2,193,606 | Ulrey | Mar. 12, 1940 |
| 2,316,550 | Bigalke | Apr. 13, 1943 |
| 2,419,052 | Becker | Apr. 15, 1947 |
| 2,585,916 | Coleman | Feb. 19, 1952 |
| 2,650,307 | Koppius | Aug. 25, 1953 |